(12) United States Patent
Schöni

(10) Patent No.: US 11,981,361 B2
(45) Date of Patent: May 14, 2024

(54) AUTOMATION SYSTEM, OPERATING METHOD FOR AUTOMATION SYSTEM, AND COMPUTER PROGRAM PRODUCT

(71) Applicant: SELECTRON SYSTEMS AG, Lyss (CH)

(72) Inventor: Ulrich Schöni, Ittigen (CH)

(73) Assignee: SELECTRON SYSTEMS AG (CH)

( * ) Notice: Subject to any disclaimer, the term of this patent is extended or adjusted under 35 U.S.C. 154(b) by 668 days.

(21) Appl. No.: 15/734,097

(22) PCT Filed: May 23, 2019

(86) PCT No.: PCT/EP2019/063379
§ 371 (c)(1),
(2) Date: Dec. 1, 2020

(87) PCT Pub. No.: WO2019/228911
PCT Pub. Date: Dec. 5, 2019

(65) Prior Publication Data
US 2021/0213982 A1   Jul. 15, 2021

(30) Foreign Application Priority Data
Jun. 1, 2018   (EP) .................................... 18175556

(51) Int. Cl.
*B61L 15/00* (2006.01)
*H04L 12/40* (2006.01)
*H04L 12/46* (2006.01)

(52) U.S. Cl.
CPC .... *B61L 15/0036* (2013.01); *H04L 12/40013* (2013.01); *H04L 12/40189* (2013.01);
(Continued)

(58) Field of Classification Search
CPC .......... B61L 15/0036; H04L 12/40013; H04L 12/40189; H04L 12/4645; H04L 2012/40215; H04L 2012/4026; H04L 2012/40293; H04L 12/4641; G05B 2219/31198; G05B 19/052; G05B 19/054;
(Continued)

(56) References Cited

U.S. PATENT DOCUMENTS

| 2013/0286820 | A1 | 10/2013 | Angst et al. |
| 2016/0308651 | A1 | 10/2016 | Pollmann |
| 2021/0213982 | A1* | 7/2021 | Schöni ................ H04L 12/4645 |

FOREIGN PATENT DOCUMENTS

| CN | 101154103 A | 4/2008 |
| CN | 101320313 A | 12/2008 |

(Continued)

OTHER PUBLICATIONS

International Search Report corresponding to PCT/EP2019/063379, dated Aug. 16, 2019.
(Continued)

*Primary Examiner* — Tyler D Paige
(74) *Attorney, Agent, or Firm* — Barnes & Thornburg LLP

(57) ABSTRACT

An automation system, an operating method for an automation system, and a computer program product enable communication between assemblies of an automation system connected to each other via a back panel bus, wherein the assemblies can exchange data with each other directly, without sending the data via a master.

10 Claims, 6 Drawing Sheets

(52) U.S. Cl.
CPC ............... *H04L 12/4645* (2013.01); *H04L 2012/40215* (2013.01); *H04L 2012/4026* (2013.01); *H04L 2012/40293* (2013.01)

(58) Field of Classification Search
CPC .. G05B 19/4185; G05B 19/0423; Y02P 90/02
USPC ........................................... 701/19
See application file for complete search history.

(56) References Cited

FOREIGN PATENT DOCUMENTS

| | | |
|---|---|---|
| CN | 103580970 A | 2/2014 |
| CN | 104461968 A | 3/2015 |
| CN | 205647560 U | 10/2016 |
| CN | 106789747 A | 5/2017 |
| CN | 106797270 A | 5/2017 |
| CN | 107911288 A | 4/2018 |
| CN | 108008657 A | 5/2018 |
| DE | 102011082965 A1 | 1/2013 |
| DE | 102014226994 A1 | 6/2016 |
| DE | 102015105929 A1 | 10/2016 |
| EP | 2661023 A1 | 11/2013 |

OTHER PUBLICATIONS

Chinese Office Action corresponding to CN 201980035112.1 dated Jan. 26, 2024.

\* cited by examiner

11,981,361 B2

AUTOMATION SYSTEM, OPERATING METHOD FOR AUTOMATION SYSTEM, AND COMPUTER PROGRAM PRODUCT

CROSS REFERENCE AND PRIORITY CLAIM

This patent application is a U.S. National Phase of International Patent Application No. PCT/EP2019/063379 filed May 23, 2019, which claims priority to European Patent Application No. 18175556.2, the disclosure of which being incorporated herein by reference in their entireties.

FIELD

The present disclosure relates to an automation system, to an operating method for an automation system and to a computer program product and relates, in particular, to an automation system, to a method and to a computer program product for communication between assemblies of an automation system which are connected to one another via a backplane bus, wherein the assemblies can directly interchange data with one another without sending the data via a master.

BACKGROUND

The prior art discloses an automation system, for example for automatically controlling functions of a rail vehicle combination, in particular for controlling and managing it ("TCMS", Train Control & Management System, below), which is constructed in a modular manner from a plurality of assemblies. In this case, a plurality of assemblies are usually fitted in a common housing. If these assemblies are intended to communicate with one another, the housing is usually equipped with an electronic printed circuit board (also "backplane") which is provided with interfaces and is designed such that the interfaces are connected to the assemblies when the assemblies are inserted into the housing.

SUMMARY

The present disclosure is directed at providing a method which enables direct communication between the assemblies, between an assembly and an external system or between the external systems or relieves the load on the master. This is achieved by the presently disclosed automation system, operating method for an automation system and a computer program product.

BRIEF DESCRIPTION OF FIGURES

An exemplary embodiment of the method according to the present disclosure is explained on the basis of the figures cited below. In this case, the exemplary embodiment is provided as an exemplary implementation of the method according to the disclosure, which does not restrict the inventive subject matter, as defined in the claims.

DETAILED DESCRIPTION

Figure 1:
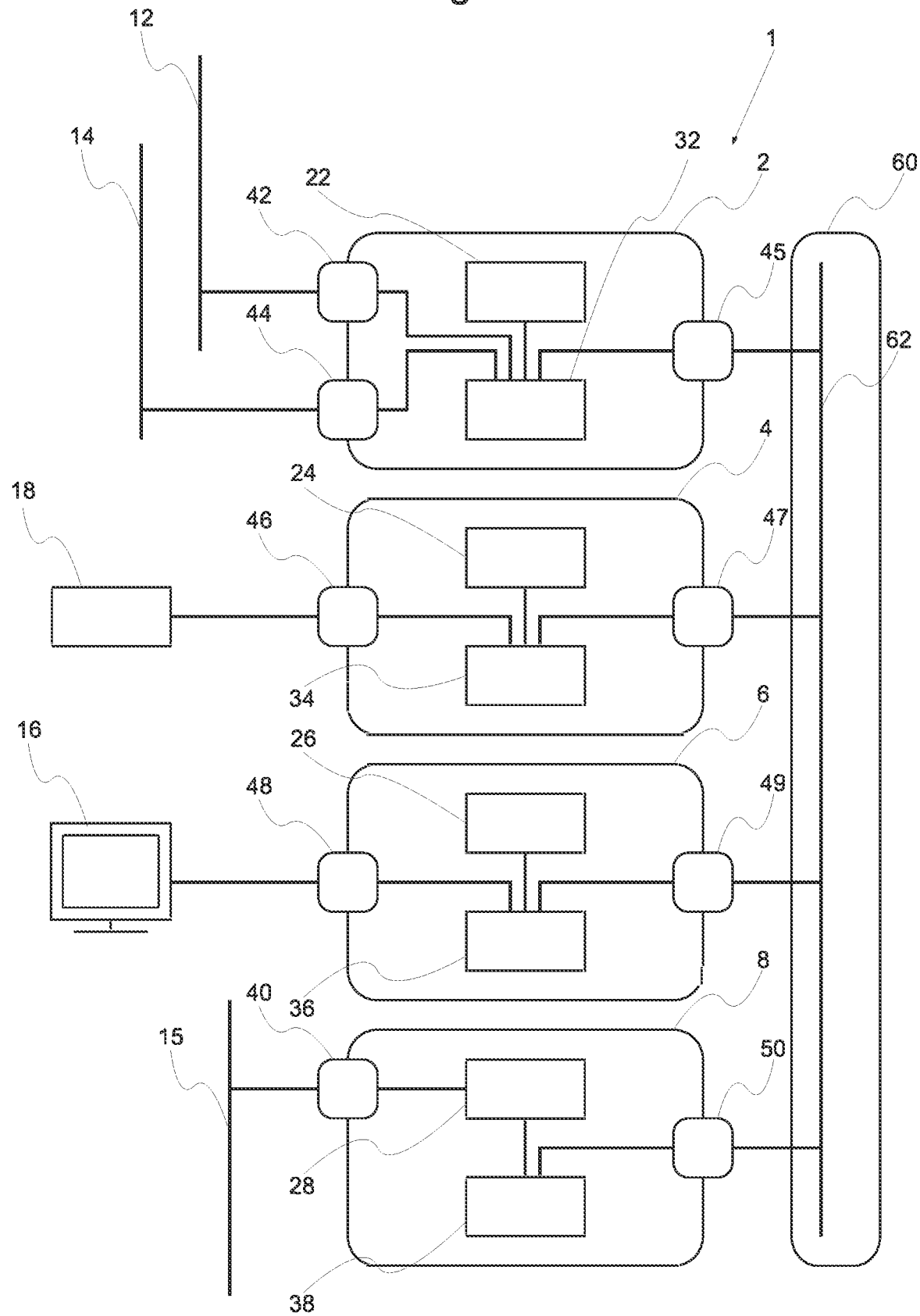
FIG. 1 shows a diagram of a first exemplary embodiment of the disclosure.

As explained above, the prior art discloses an automation system, for example for automatically controlling functions of a rail vehicle combination, in particular for controlling and managing it ("TCMS", Train Control & Management System, below), which is constructed in a modular manner from a plurality of assemblies. In this case, a plurality of assemblies are usually fitted in a common housing. If these assemblies are intended to communicate with one another, the housing is usually equipped with an electronic printed circuit board (also "backplane") which is provided with interfaces and is designed such that the interfaces are connected to the assemblies when the assemblies are inserted into the housing.

The assemblies can be connected in different ways via the interfaces. In the case of star-shaped line routing, the connections of the interfaces for a plurality of identical assemblies lead separately to the interface of a central assembly. The respective assemblies then already cannot physically communicate directly with one another, but only directly with the central assembly. Communication among the assemblies takes place via the central assembly as a relay.

If the interfaces share a communication medium, that is to say all interfaces are connected via the same or continuous conductor tracks, they constitute a bus ("backplane bus"). Since transmission interference or even damage to the connected assemblies can result if a plurality of assemblies access the bus at the same time for transmission, mechanisms for bus access arbitration must be provided in this case in the communication protocol used in order to control which communication participant connected to the bus receives access to the communication medium if a plurality of communication participants want to access the bus at the same time. Various communication protocols such as CAN bus according to ISO 11898, Ethernet according to IEEE 802.3, RS-232 according to ANSI/EIA/TIA-232-F/RS-422 according to ANSI/EIA/TIA-422-B-1994/RS-485 according to ANSI/EIA/TIA-485, USB, PCI and others are known for communication via the star-shaped line routing or the backplane bus.

Alternatively, automation systems are known in which the backplane bus functionality is not provided via an accordingly configured printed circuit board, but rather in which the assemblies are connected to one another via a single-core or multi-core flexible cable. In these automation systems in particular, it is not necessary for all assemblies to be accommodated in a common housing, but rather can be arranged at different locations in the rail vehicle.

Automation systems having star-shaped line routing or, in particular, with a backplane bus using the CAN bus communication protocol are usually used in the prior art. In this case, the automation system is constructed in such a manner that one assembly, as a superordinate assembly (master), controls the communication among the assemblies. This automation system allows the communication between individual assemblies to be isolated from other assemblies, with the result that assemblies with a malfunction cannot intervene in communication between other assemblies in an unauthorized manner The automation system from the prior art has the problem that the superordinate assembly is involved in every communication operation, which results in overloading of the superordinate assembly and, without the provision of redundancies, results in the failure of the automation system if the superordinate assembly fails.

Furthermore, in the known automation system, it is not possible to provide assemblies having further communication interfaces for external systems, with the result that data can be transmitted or forwarded between the external systems via interfaces of different assemblies.

Therefore, the present disclosure is directed to providing a method which enables direct communication between the assemblies, between an assembly and an external system or between the external systems or relieves the load on the master.

Disclosed is an automation system having: a backplane bus, a first assembly, wherein the first assembly has: a first control unit which is configured to control and monitor the first assembly and to undertake the function of a superordinate control unit for the automation system, a first communication interface which can be connected to a first segment of a train control and management system network, a second communication interface which is connected to the backplane bus, a first network switch which connects the first communication interface, the second communication interface and the control unit to one another in such a manner that data communication can take place according to the Ethernet protocol, a second assembly, wherein the second assembly has: a second control unit which is configured to control and monitor the second assembly, a third communication interface which is connected to a second segment of the train control and management system network of the train control and management system network, a fourth communication interface which is connected to the backplane bus, a second network switch which connects the third communication interface, the fourth communication interface and the second control unit to one another in such a manner that data communication takes place according to the Ethernet protocol, wherein the first network switch and the second network switch are configured to establish and process a single tagged VLAN according to IEEE 802.1Q and to form and process a double tagged VLAN according to IEEE 802.1ad, the train control and management network forms a first single tagged VLAN (V1) according to IEEE 802.1Q, to which the control unit is connected as a terminal device of the train control and management network, a single tagged VLAN (V3) according to IEEE 802.1Q is established between the first control unit and the second control unit via the backplane bus, via which single tagged VLAN the control unit can communicate with the control unit and can control the latter, and a first double tagged VLAN (T1) according to IEEE 802.1ad is established between the first network switch and the second network switch via the backplane bus.

The disclosed automation system allows a plurality of assemblies on the backplane bus to communicate with one another without data having to be routed via a central location (master), as a result of which the workload of the central location falls.

Also disclosed is an automation system, wherein, optionally, the first segment of the train control and management system network comprises an individual terminal device of the train control and management system network or a subnetwork, via which a plurality of terminal devices of the train control and management system network are connected, and the second segment of the train control and management system network comprises an individual terminal device of the train control and management system network or a subnetwork, via which a plurality of terminal devices of the train control and management system network are connected.

It is also disclosed that, optionally, in the automation system, the first assembly also has: a fifth communication interface which is connected to a first segment of a communication network which forms a second single tagged VLAN (V2) according to IEEE 802.1Q, to which the control unit is connected as a terminal device, and the automation system has a third assembly, wherein the third assembly has: a third control unit which is configured to control and monitor the third assembly, a sixth communication interface which is connected to a first segment of the communication network, a seventh communication interface which is connected to the backplane bus, a third network switch which connects the sixth communication interface, the seventh communication interface and the third control unit to one another in such a manner that data communication can take place according to the Ethernet protocol, wherein the single tagged VLAN (V3) according to IEEE 802.1Q is established between the first control unit and the third control unit via the backplane bus, via which single tagged VLAN the first control unit can communicate with the third control unit and can control the latter, and a second double tagged VLAN (T2) according to IEEE 802.1ad is established between the first network switch and the third network switch via the backplane bus.

Also, disclosed is an automation system, wherein, optionally, the first segment of the communication network comprises an individual terminal device of the communication network or a subnetwork, via which a plurality of terminal devices of the communication network are connected, and the second segment of the communication network comprises an individual terminal device of the communication network or a subnetwork, via which a plurality of terminal devices of the communication network are connected.

Also disclosed is an automation system, wherein, optionally, the automation system has a fourth assembly, wherein the fourth assembly has: a fourth control unit which is configured to control and monitor the fourth assembly and to be used as a terminal for a CAN bus, an eighth communication interface which is connected to a first segment of a CAN bus and to the fourth control unit, a ninth communication interface which is connected to the backplane bus, a fourth network switch which connects the ninth communication interface and the fourth control unit to one another in such a manner that data communication can take place according to the Ethernet protocol, wherein the single tagged VLAN (V3) according to IEEE 802.1Q is established between the first control unit and the fourth control unit via the backplane bus, via which single tagged VLAN the first control unit can communicate with the fourth control unit and can control the latter.

Also disclosed is an operating method for an automation system, which has the operations of: establishing a single tagged VLAN (V3) according to IEEE 802.1Q between the first control unit and the second control unit via the backplane bus, via which single tagged VLAN the control unit can communicate with the control unit and can control the latter, establishing a first double tagged VLAN (T1) according to IEEE 802.1ad between the first network switch and the second network switch via the backplane bus, transmitting the data traffic of the first single tagged VLAN (V1) according to IEEE 802.1Q, via the first double tagged VLAN (T1), between the first network switch and the second network switch via the backplane bus.

Also disclosed is the operating method for an automation system, which, optionally, also has the operations of: establishing a single tagged VLAN (V3) according to IEEE 802.1Q between the first control unit and the third control unit via the backplane bus, via which single tagged VLAN the first control unit can communicate with the third control unit and can control the latter, establishing a second double tagged VLAN (T2) according to IEEE 802.1ad between the first network switch and the third network switch via the backplane bus, transmitting the data traffic of the second single tagged VLAN (V2) according to IEEE 802.1Q, via the second double tagged VLAN (T2), between the first network switch and the third network switch via the backplane bus.

Also disclosed is the operating method for an automation system, which, optionally also has the operations of: establishing a single tagged VLAN (V3) according to IEEE 802.1Q between the first control unit and the fourth control unit via the backplane bus, via which single tagged VLAN the first control unit can communicate with the fourth control unit and can control the latter.

Also disclosed is a computer program product which is configured to control an automation system in such a manner that one of the operating methods described above is carried out.

The structure of a first exemplary embodiment of an automation system for the method according to the disclosure is described with reference to FIG. 1.

An automation system 1 is a system for automating technical processes in an environment of controlled apparatuses. In the present case, the automation system is a system for automatically controlling functions of a rail vehicle combination, for example the opening and closing of train doors, the control of air-conditioning systems, lighting, drive and deceleration apparatuses, the output of announcements, etc.

The automation system has a housing. The first assembly 2, the second assembly 4, the third assembly 6 and the fourth assembly 8 are accommodated in the housing. The backplane 60 is also provided in the housing.

The backplane 60 comprises the backplane bus 62.

The first assembly 2 has a network switch 32. A plurality of network users can be connected to one another via the network switch 2. As the communication protocol, the network switch 2 uses Ethernet according to the IEEE 802.3 standard. The network switch 2 is also configured to transmit data communication in a single tagged manner as virtual local area networks ("VLAN") according to IEEE 802.1Q ("tagged VLAN"). The network switch 2 is also configured to transmit data communication in a double tagged manner as an interleaved VLAN according to IEEE 802.1ad ("double tagged VLAN").

The first assembly 2 has a first communication interface 42, a second communication interface 44 and a third communication interface 45 which are connected to the network switch 32 and are configured to transmit data communication according to the Ethernet protocol. The first communication interface 42 is connected to a multimedia network 12. The second communication interface 42 is connected to a train control and management system network 14 (TCMS network). The third communication interface is connected to the backplane bus 62 of the backplane 60.

The first assembly 2 has a control unit 22. The control unit 22 is connected to the network switch 32 and is configured to communicate with the latter by means of the Ethernet protocol. The control unit 22 controls and monitors the first assembly 2. It also controls the communication networks inside the automation system and acts here as a superordinate control unit ("master") of the automation system 1. The control unit is also a terminal device in the train control and management system. The control unit 22 is configured to transmit data communication in a double tagged manner as a VLAN according to IEEE 802.1ad.

The second assembly 4 is constructed in substantially the same manner as the first assembly 2. Differences from the assembly 2 are described below. For the rest, reference is made to the description of the first assembly 2. The second assembly 4 has only two communication interfaces 46, 47 which are connected to a network switch 34. The second assembly is connected to a TCMS terminal device 18 of the train control and management system network 14, for example a train door, via the communication interface 46. The second assembly 4 is connected to the backplane bus 62 via the communication interface 47. A control unit 24 controls and monitors the second assembly 4.

The third assembly 6 is constructed in substantially the same manner as the second assembly 4. Differences from the assembly 4 are described below. For the rest, reference is made to the description of the second assembly 4. The third assembly 6 has a communication interface 48, via which the third assembly 6 is connected to a terminal device 18 of the multimedia network 12, for example a screen for displaying images and image sequences/films.

The fourth assembly 8 is constructed in substantially the same manner as the second assembly 4. Differences from the assembly 4 are described below. For the rest, reference is made to the description of the second assembly 4. The fourth assembly 8 has a communication interface 40 which is configured to be connected to a CAN bus and to transmit data communication according to ISO 11898. A control unit 28 is connected to the communication interface 40 and operates as a terminal device of the CAN bus. The control unit 28 is also connected to a network switch 38 and is connected to the backplane bus 62 via the network switch and a communication interface 50. The control unit 28 controls and monitors the fourth assembly 8. The control unit 28 can be in communication with further control devices or terminal devices (not illustrated) via the CAN bus 15.

Figure 2:
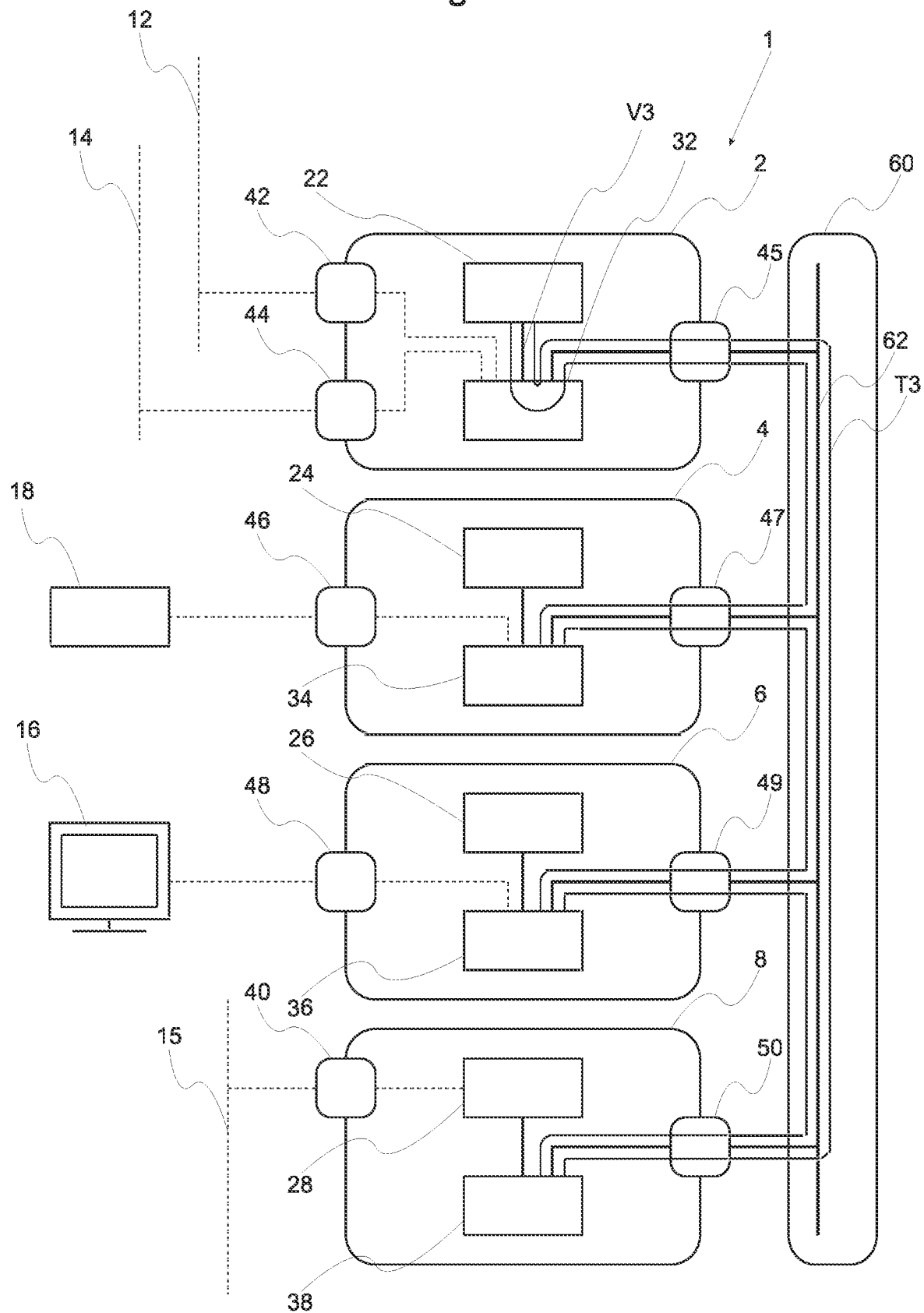
FIG. 2 shows a diagram of the virtual network V3 from the first exemplary embodiment.

A virtual communication network V3 inside the automation system is described on the basis of FIG. 2.

The communication network V3, illustrated by means of solid lines in FIG. 2, is used for communication between the control unit 22, in its function as a superordinate control unit, and the control units 24, 26 and 28. A double tagged VLAN T3 according to IEEE 802.1ad is established for this purpose between the network switches 32, 34, 36 and 38, via which double tagged VLAN the communication network V3 is tunneled. For this purpose, the data packets of the Ethernet protocol between the network switches are provided with an additional tag and an identification number for a VLAN, which allows the network switches 32, 34, 36 and 38 involved in the data communication to assign the data packet to a VLAN and to ensure that only authorized terminal devices, here the control units 22, 24, 26 and 28, participate in the data communication via the VLAN V3. Data communication from the VLAN V3 or the tunnel T3 is not transmitted by the network switches to further terminal devices, for example the multimedia terminal device 16 or the TCMS terminal device 18.

Figure 3:
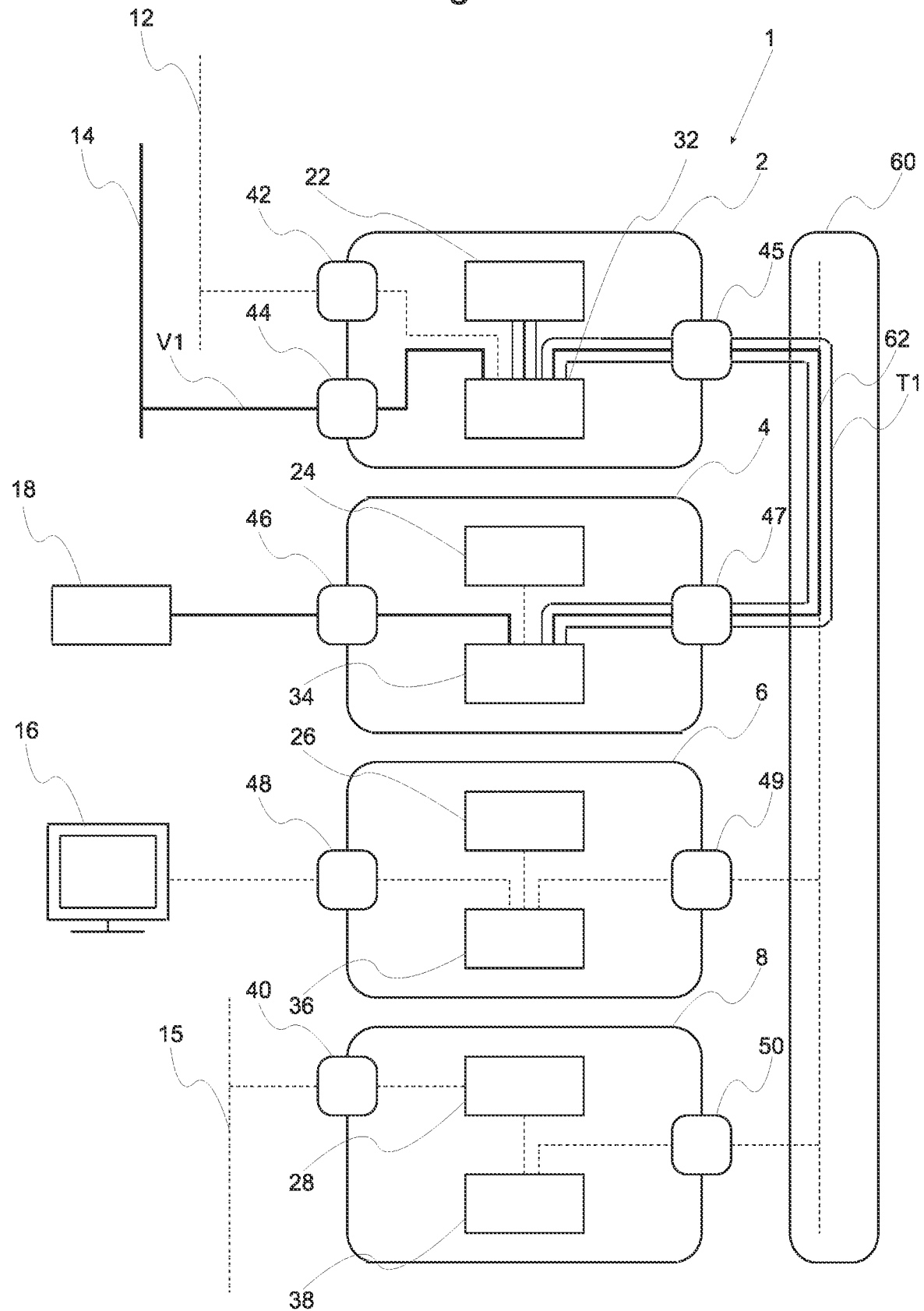
FIG. 3 shows a diagram of the virtual network V1 from the first exemplary embodiment.

A virtual communication network V1 inside the automation system is described on the basis of FIG. 3.

The virtual communication network V1, illustrated by means of solid lines in FIG. 3, is used for communication between terminal devices of the train control and management system network 14. Since the train control and management system network 14 is already in the form of a VLAN and the data packets of the Ethernet protocol are therefore provided with a tag and a VLAN identification number according to IEEE 802.1Q, it is not possible to establish a VLAN according to IEEE 802.1Q in order to set up a VLAN between the control unit 22, the network switch 32 and the network switch 34. In order to extend the data traffic of the VLAN V1 across a plurality of assemblies, it is necessary for a double tagged VLAN according to IEEE 802.1ad to be established between the control unit 22, the network switch 32 and the network switch 34. When transmitting the data packet between the control unit 22, the network switch 32 and the network switch 34, a second tag and a second VLAN identification number are prefixed to the VLAN tag of the train control and management system network 14, an assignment of the data packet to a further, interleaved VLAN is enabled and a communication tunnel T1 is therefore established between the control unit 22, the network switch 32 and the network switch 34. This allows the control unit 22 and the network switches 32 and 34 involved in the data communication to assign the data packet to a VLAN and to ensure that only authorized terminal devices, here the communication interfaces 44 and 46 and the control unit 22, participate in the data communication via the VLAN V1. Data communication from the VLAN V1 is not transmitted by the network switches to further terminal devices, for example the multimedia terminal device 16 or the multimedia network 12. The control unit 22 likewise constitutes a terminal device of the TCMS network 12 and undertakes the function of a superordinate control unit.

Figure 4:
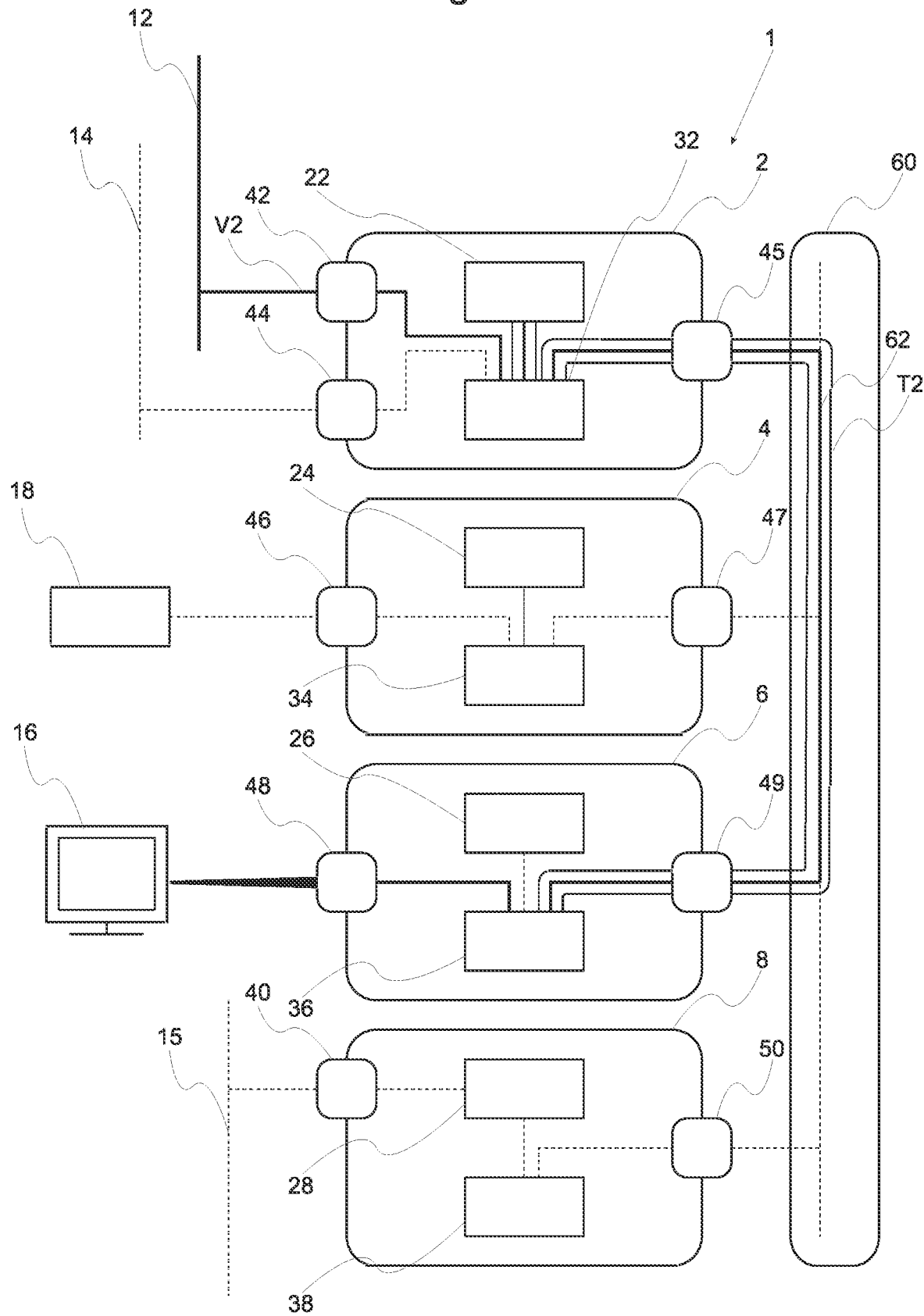
FIG. 4 shows a diagram of the virtual network V2 from the first exemplary embodiment.

A virtual communication network V2 inside the automation system is described on the basis of FIG. 4.

The virtual communication network V2, illustrated by means of solid lines in FIG. 4, is used for communication between terminal devices of the multimedia network 12. Since, like the TCMS network 12, the multimedia network 12 is already in the form of a VLAN and the data packets of the Ethernet protocol are therefore provided with a tag and a VLAN identification number according to IEEE 802.1Q, it is not possible to establish a VLAN according to IEEE 802.1Q in order to set up a VLAN between the network switch 32 and the network switch 36. In order to extend the data traffic of the VLAN V2 over a plurality of assemblies, it is necessary for a double tagged VLAN according to IEEE 802.1ad to be established between the control unit 22, the network switch 32 and the network switch 36. When transmitting the data packet between the control unit 22, the network switch 32 and the network switch 34, a second tag and a second VLAN identification number are prefixed to the VLAN tag of the multimedia network V1, an assignment of the data packet to a further, interleaved VLAN is enabled and a communication tunnel T2 is therefore established between the control unit 22, the network switch 32 and the network switch 36. This allows the control unit 22 and the network switches 32 and 36 involved in the data communication to assign the data packet to a VLAN and to ensure that only authorized terminal devices, here the communication interfaces 44 and 48 and the control unit 22, participate in the data communication via the VLAN V2. Data communication from the VLAN V1 is not transmitted by the network switches to further terminal devices, for example the TCMS terminal device 16 or the TCMS network 12. The control unit 22 also undertakes the function of a superordinate control unit when transmitting the multimedia data communication.

Figure 5A:
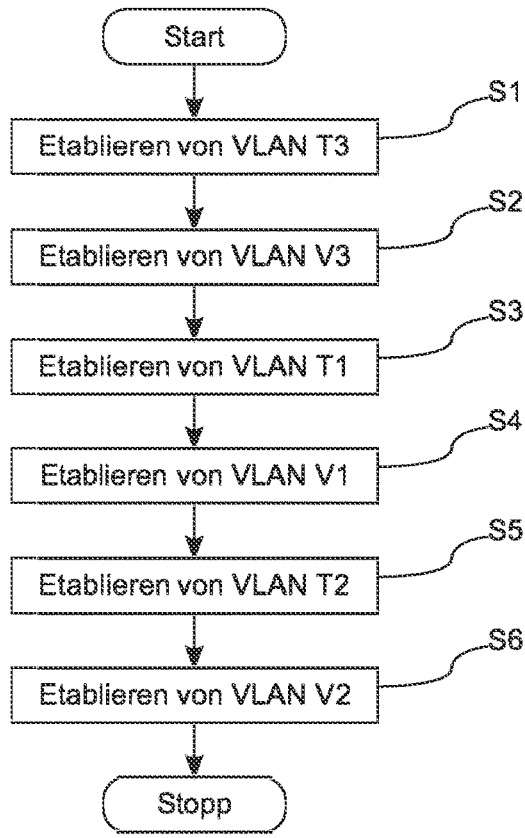
FIGS. 5a and 5b show two variants of a flowchart of the method according to the disclosure.

An operating method of the automation system from the exemplary embodiment is explained on the basis of FIG. 5a.

In the automation system 1 from the exemplary embodiment, a double tagged VLAN T3 according to IEEE 802.1ad is established in a first operation S1 between the first control unit 22, the first network switch 32, the second network switch 34, the third network switch 36 and the fourth network switch 38 via the backplane bus 62.

In a second operation S2, a single tagged VLAN according to IEEE 802.1Q, an unencrypted communication connection assigned to a VLAN or a VLAN defined in another manner is established, as a communication connection V3, between the first control unit 22, the second control unit 24, the third control unit 26 and the fourth control unit 28 via the VLAN T3 via the backplane bus 62, via which the first control unit 22 can communicate with other control units and can control the latter.

In a third operation S3, a first double tagged VLAN T1 according to IEEE 802.1ad is established between the first control unit 22, the first network switch 32 and the second network switch 34 via the backplane bus 62.

In a fourth operation S4, data traffic of the first single tagged VLAN V1 according to IEEE 802.1Q is transmitted, via the first double tagged VLAN T1, between the first network switch 32 and the second network switch 34 via the backplane bus 62.

In a fifth operation S5, a second double tagged VLAN T2 according to IEEE 802.1ad is established between the first control unit 22, the first network switch 32 and the third network switch 36 via the backplane bus 62.

In a sixth operation S6, data traffic of the second single tagged VLAN V2 according to IEEE 802.1Q is transmitted, via the second double tagged VLAN T2, between the first network switch 32 and the third network switch 34 via the backplane bus 62.

Figure 5B:
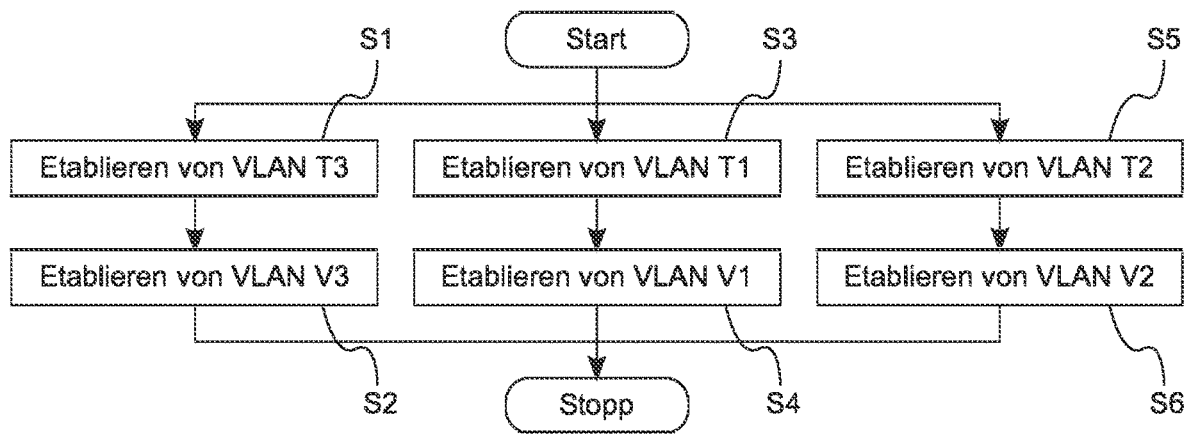

In the exemplary embodiment, operations S1, S2, S3, S4 and S5 are carried out in the stated sequence. Deviations from this are possible. A sequential dependence respectively exists only between operations S1 and S2, and S3 and S4, and S5 and S6, with the result that the operations can moreover be carried out in another sequence or even concurrently. Such a process is illustrated in FIG. 5b.

Figure 6:
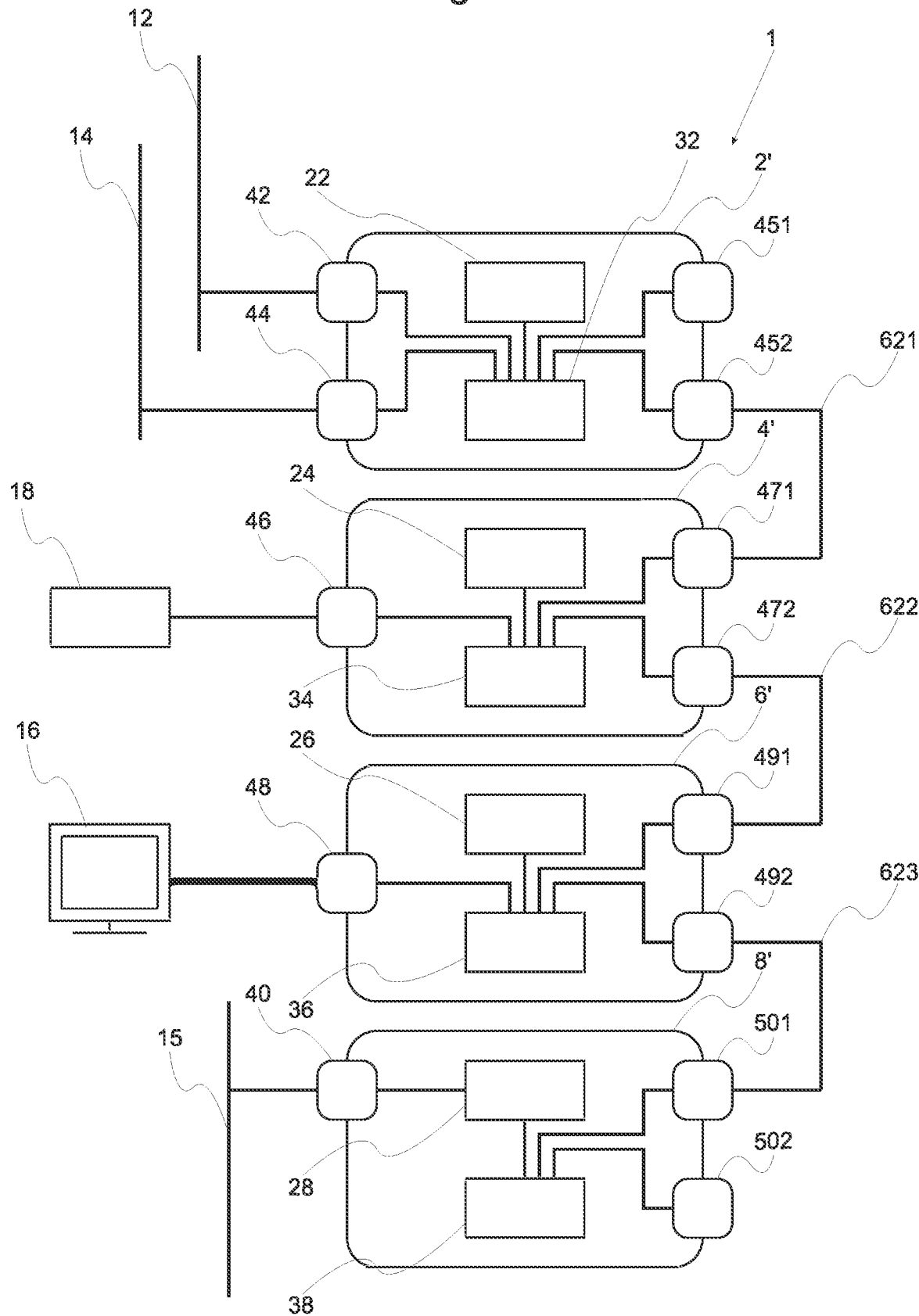
FIG. 6 shows a diagram of a second exemplary embodiment.

The structure of a second exemplary embodiment of an automation system for the method according to the disclosure is described with reference to FIG. 6. The second exemplary embodiment is substantially the same as the first exemplary embodiment. The differences between the second exemplary embodiment and the first exemplary embodiment are described below. Apart from these differences, all features and properties of the first exemplary embodiment can be applied to the second exemplary embodiment.

In contrast to the first exemplary embodiment, the automation system 1' from the second exemplary embodiment does not have a housing and a backplane. It has a first assembly 2', a second assembly 4', a third assembly 6' and a fourth assembly 8'. The assemblies are accommodated in their own modules and do not share a common housing.

Instead of the third communication interface 45 from the first assembly 2 of the first exemplary embodiment, the first assembly 2' has a fourth communication interface 451 and a fifth communication interface 452 which are connected to the network switch 32 in such a manner that Ethernet communication connections can be set up via the switch. For the rest, the first assembly 2' has all of the features and functions of the first assembly 2 of the first exemplary embodiment.

Instead of the communication interface 47 from the second assembly 4 of the first exemplary embodiment, the second assembly 4' has a communication interface 471 and a communication interface 472 which are connected to the network switch 34 in such a manner that Ethernet communication connections can be set up via the switch. For the rest, the second assembly 4' has all of the features and functions of the second assembly 4 of the first exemplary embodiment.

The communication interface 452 of the first assembly 2' is connected to the communication interface 471 of the second assembly 4' via a first backplane cable 621.

Instead of the communication interface 49 from the third assembly 6 of the first exemplary embodiment, the third assembly 6' has a communication interface 491 and a communication interface 492 which are connected to the network switch 36 in such a manner that Ethernet communication connections can be set up via the switch. For the rest, the third assembly 6' has all of the features and functions of the third assembly 6 of the first exemplary embodiment.

The communication interface 472 of the second assembly 4' is connected to the communication interface 491 of the third assembly 4' via a second backplane cable 622.

Instead of the communication interface 50 from the fourth assembly 8 of the first exemplary embodiment, the fourth assembly 8' has a communication interface 501 and a communication interface 502 which are connected to the network switch 38 in such a manner that Ethernet communication connections can be set up via the switch. For the rest, the fourth assembly 8' has all of the features and functions of the fourth assembly 4 of the first exemplary embodiment.

The communication interface 472 of the third assembly 6' is connected to the communication interface 501 of the fourth assembly 8' via a third backplane cable 623.

An operating method of the automation system 1' from the second exemplary embodiment is carried out in the same manner as in the first exemplary embodiment with the difference that the data communication which is carried out via the backplane bus 62 in the first exemplary embodiment is carried out via the first backplane cable 621, the second backplane cable 622 or the third backplane cable 623 in the second exemplary embodiment. For example, the VLAN T1 is set up from the first network switch 32, via the backplane cable 621, to the second network switch 34. Furthermore, the VLAN T2, for example, is set up from the first network switch 32, via the backplane cable 621, to the second network switch 34 and from the second network switch 34, via the backplane cable 622, to the third network switch 36. Furthermore, the VLAN T3, for example, is set up from the first network switch 32, via the backplane cable 621, to the second network switch 34, from the second network switch 34, via the backplane cable 622, to the third network switch 36 and from the third network switch 36, via the backplane cable 623, to the fourth network switch 38.

In the second exemplary embodiment, the assemblies 2', 4', 6', 8' are arranged and connected to one another in a particular order. This order is exemplary and any other order is possible.

Since the assemblies 2, 2', 4, 4', 6, 6', 8, 8', the external systems 12, 14, 16, 18 and the Ethernet communication interface 42, 44, 46, 48 are divided into networks V1, V2, V3 by means of Ethernet VLANs, direct communication between the assemblies 2, 2', 4, 4', 6, 6', 8, 8' and the external systems 12, 14, 16, 18 can be specifically reproduced if necessary so that not all communication has to take place via a master and the load on the master is therefore relieved.

In the above exemplary embodiments, the networks V1 and V2 are single tagged VLANs according to IEEE 802.1Q. Although the above teaching allows the forwarding of single tagged VLANs via the backplane bus by means of doubled tagged VLANs according to IEEE 802.1ad, it does not presuppose any VLANs according to IEEE 802.1Q, with the result that the networks V1 and V2 may also be conventional, unencrypted and untagged Ethernet data traffic which was previously not assigned to any VLAN or to a VLAN which is defined via connection locations, rather than tags. The same applies to the network V3.

In the above exemplary embodiments, the automation system having four assemblies is described. However, depending on the functional requirements, the automation system may comprise only two or more assemblies, in particular more than four assemblies.

In the above exemplary embodiments, the assemblies having a particular number of interfaces are described. However, depending on requirements, the assemblies may also have further interfaces.

In the above exemplary embodiments, the automation system is a system for automatically controlling functions of a rail vehicle combination. However, the disclosure is not restricted to automation systems such as systems for automatically controlling functions of a rail vehicle combination. The automation system may also be a system for controlling manufacturing systems in a manufacturing company or another system.

In the second exemplary embodiment, the automation system is provided with the backplane cables 621, 622, 623 which connect the assemblies 2', 4', 6' and 8' to one another. Alternatively, the communication interfaces 451, 452, 471, 472, 491, 492, 501 and 502 may be arranged on the assemblies and configured such that the assemblies are directly connected to adjacent assemblies via these interfaces by means of stacking and a backplane bus formed outside the assemblies is dispensed with.

In the above exemplary embodiments, the assemblies are equipped with particular functionalities. The first assembly 2, 2' is connected to the multimedia network 12 and to the TCMS network 14, whereas the second assembly 4, 4' is connected to a terminal device of the TCMS network 18 and the third assembly 6, 6' is connected to a terminal device of the multimedia network 12. Furthermore, the fourth assembly 8, 8' is connected to a CAN bus. In a manner which is apparent to a person skilled in the art, the functionality can also be distributed differently among the assemblies. One or more terminal devices from the multimedia network 12 or from the train control and management network 14 or, with the provision of a control apparatus such as that from the fourth assembly 8, 8', a CAN bus can be connected to the first assembly 2, 2', the second assembly 4, 4' or the third assembly 6, 6', for example via one or more further communication interfaces.

In the above exemplary embodiments, only the first control unit 22 of the first assembly 2, 2' is configured to transmit data communication in a double tagged manner as a VLAN according to IEEE 802.1ad. This is necessary in the exemplary embodiments since the first control unit 22 transmits data communication via a plurality of VLANs, that is to say via the double tagged VLANs T1, T2, T3, and the control unit 22 distinguishes the corresponding VLANs via their tag. The other control units 24, 26, 28 transmit data communication only via the VLAN T3 in the exemplary embodiments, which is why there is no need for these control units to differentiate between different double tagged VLANs. Depending on their range of functions, in particular if a plurality of functions are performed by an assembly, the other control units 24, 26, 28 may be configured to transmit data communication in a double tagged manner as a VLAN according to IEEE 802.1ad. This is the case, in particular, when a control unit transmits data communication via more than one double tagged VLAN.

One or more terminal devices from the multimedia network 12 or from the train control and management network 14 can be connected to the first assembly 2, for example via one or more further communication interfaces.

Since the automation system from the exemplary embodiment has a modular structure, individual assemblies, in particular the second assembly 4, the third assembly 6 or the fourth assembly 8, can be removed from the automation system with the cessation of their functionality and features, and the automation system 1 can be operated in this manner Further modifications of the invention within the scope of the patent claims are possible.

The sentential connectives . . . "and", "or" and "either . . . or" are used in the sense based on the logical conjunction, the logical adjunction (often "and/or") or the logical non-equivalence.

LIST OF REFERENCE SIGNS

1 Automation system
2, 2' First assembly
4, 4' Second assembly
6, 6' Third assembly
8, 8' Fourth assembly
12 Multimedia network
14 TCMS network
15 CAN bus network
16 Multimedia terminal (external system)
18 TCMS terminal (external system)
22, 24, 26, 28 Control unit
32, 34, 36, 38 Network switch
V1, V2, V3 Virtual network
T1, T2 Communication tunnel
40 Communication interface (CAN bus)
42, 44, 45, 46, 47, 48, 48, 50, 451, 452, 471, 472, 491, 492, 501,
502 Communication interface (Ethernet)
60 Backplane
62 Backplane bus (Ethernet)
621, 622, 623 Backplane cable

The invention claimed is:

1. An automation system comprising:
a backplane bus;
a first assembly, wherein the first assembly has:
a first control unit configured to control and monitor the first assembly and to undertake the function of a superordinate control unit for the automation system,
a first communication interface connectable to a first segment of a train control and management system network,
a second communication interface connected to the backplane bus,
a first network switch which connects the first communication interface, the second communication interface and the control unit to one another such that data communication takes place according to the Ethernet protocol, a second assembly, wherein the second assembly has:
a second control unit configured to control and monitor the second assembly,
a third communication interface connected to a second segment of the train control and management system network of the train control and management system network,
a fourth communication interface connected to the backplane bus,
a second network switch which connects the third communication interface, the fourth communication interface and the second control unit to one another such that data communication takes place according to the Ethernet protocol,
wherein the first network switch and the second network switch are configured to establish and process a single tagged VLAN according to IEEE 802.1Q and to form and process a double tagged VLAN according to IEEE 802.1ad,
wherein the train control and management network forms a first single tagged virtual local area network VLAN (V1) according to IEEE 802.1Q, to which the control unit is connected as a terminal device of the train control and management network,
wherein a single tagged VLAN (V3) according to IEEE 802.1Q is established between the first control unit and the second control unit via the backplane bus, via which single tagged VLAN, the control unit communicates with the control unit and controls the latter, and
a first double tagged VLAN (T1) according to IEEE 802.1ad is established between the first network switch and the second network switch via the backplane bus.

2. The automation system of claim 1, wherein the first segment of the train control and management system network comprises an individual terminal device of the train control and management system network or a subnetwork, via which a plurality of terminal devices of the train control and management system network are connected, and wherein the second segment of the train control and management system network comprises an individual terminal device of the train control and management system network or a subnetwork, via which a plurality of terminal devices of the train control and management system network are connected.

3. The automation system of claim 1, wherein:
the first assembly also has a fifth communication interface connected to a first segment of a communication network which forms a second single tagged VLAN according to IEEE 802.1Q, to which the control unit is connected as a terminal device, and
the automation system has a third assembly, wherein the third assembly has:
a third control unit configured to control and monitor the third assembly,
a sixth communication interface connected to a first segment of the communication network,
a seventh communication interface connected to the backplane bus,
a third network switch which connects the sixth communication interface, the seventh communication interface and the third control unit to one another such that data communication takes place according to the Ethernet protocol,
wherein the single tagged VLAN (V3) according to IEEE 802.1Q is established between the first control unit and the third control unit via the backplane bus, via which single tagged VLAN, the first control unit communicates with the third control unit and controls the latter, and wherein a second double tagged VLAN (T2) according to IEEE 802.1ad is established between the first network switch and the third network switch via the backplane bus.

4. The automation system of claim 3, wherein the first segment of the communication network comprises an individual terminal device of the communication network or a subnetwork, via which a plurality of terminal devices of the communication network are connected, and wherein the second segment of the communication network comprises an individual terminal device of the communication network or a subnetwork, via which a plurality of terminal devices of the communication network are connected.

5. The automation system of claim 1, wherein the automation system has a fourth assembly, wherein the fourth assembly has:

a fourth control unit configured to control and monitor the fourth assembly and is used as a terminal for a CAN bus, an eighth communication interface connected to a first segment of a CAN bus and to the fourth control unit, a ninth communication interface connected to the backplane bus, and a fourth network switch which connects the ninth communication interface and the fourth control unit to one another such that data communication takes place according to the Ethernet protocol, wherein the single tagged VLAN (V3) according to IEEE 802.1Q is established between the first control unit and the fourth control unit via the backplane bus, via which single tagged VLAN, the first control unit communicates with the fourth control unit and controls the latter.

6. The automation system of claim 1, wherein the first control unit or the second control unit is configured to establish a second double tagged VLAN according to IEEE 802.1ad.

7. An operating method for an automation system, the method comprising:

establishing a single tagged virtual local area network VLAN (V3) according to IEEE 802.1Q between a first control unit and a second control unit via a backplane bus, via which single tagged VLAN, the first control unit communicates with the second control unit and controls the latter, establishing a first double tagged VLAN (T1) according to IEEE 802.1ad between a first network switch and a second network switch via the backplane bus, and transmitting the data traffic of a first single tagged VLAN (V1) according to IEEE 802.1Q, via the first double tagged VLAN (T1), between the first network switch and the second network switch via the backplane bus.

8. The operating method of claim 7, further comprising:

establishing a single tagged VLAN (V3) according to IEEE 802.1Q between the first control unit and a third control unit via the backplane bus, via which single tagged VLAN, the first control unit communicates with the third control unit and controls the latter, establishing a second double tagged VLAN (T2) according to IEEE 802.1ad between the first network switch and a third network switch via the backplane bus, transmitting the data traffic of the second single tagged VLAN (V2) according to IEEE 802.1Q, via the second double tagged VLAN (T2), between the first network switch and the third network switch via the backplane bus.

9. The operating method of claim 7, further comprising:

establishing a single tagged VLAN (V3) according to IEEE 802.1Q between the first control unit and a fourth control unit via the backplane bus, via which single tagged VLAN, the first control unit communicates with the fourth control unit and controls the latter.

10. A non-transitory computer program product including instructions, which when executed on a computer, control the automation system of claim 1 such that:

a single tagged VLAN (V3) according to IEEE 802.1Q is established between the first control unit and the second control unit via the backplane bus, via which single tagged VLAN, the first control unit communicates with the second control unit and controls the latter, a first double tagged VLAN (T1) according to IEEE 802.1ad is established between the first network switch and the second network switch via the backplane bus, and the data traffic of the first single tagged VLAN (V1) according to IEEE 802.1Q is transmitted, via the first double tagged VLAN (T1), between the first network switch and the second network switch via the backplane bus.

* * * * *